No. 614,093. Patented Nov. 15, 1898.
M. B. EVY.
GAGE FOR CAR WHEELS AND JOURNALS.
(Application filed Jan. 26, 1898.)
(No Model.)

Witnesses

Inventor
Melvin B. Evy
By _____
his Attorney

UNITED STATES PATENT OFFICE.

MELVIN B. EVY, OF LIMA, OHIO.

GAGE FOR CAR-WHEELS AND JOURNALS.

SPECIFICATION forming part of Letters Patent No. 614,093, dated November 15, 1898.

Application filed January 26, 1898. Serial No. 668,012. (No model.)

*To all whom it may concern:*

Be it known that I, MELVIN B. EVY, a citizen of the United States of America, and a resident of Lima, in the State of Ohio, have invented a new and useful Improvement in Gages for Car-Wheels and Journals, of which the following is a specification.

This invention relates to standard gages for use in inspecting car-wheels and to means for measuring car-axle journals; and its primary object is to combine with a standard wheel-gage a simple and effective journal-gage in the form of folding calipers, so that the two may be conveniently carried as one instrument.

Another object is to facilitate measuring such journals.

Heretofore it has been necessary to remove the packing from axle-boxes or to hoist the car-body, so as to relieve the brasses from its weight, before accurate measurements of the journals could be made. The improved gage is readily applied to the journals without such preparations, and a great saving in time and labor is thus effected.

The invention consists in certain novel combinations of parts and in a peculiar wheel and journal gage embodying the same and possessing above advantages, as hereinafter set forth and claimed.

A sheet of drawings accompanies this specification as part thereof.

Figure 1:
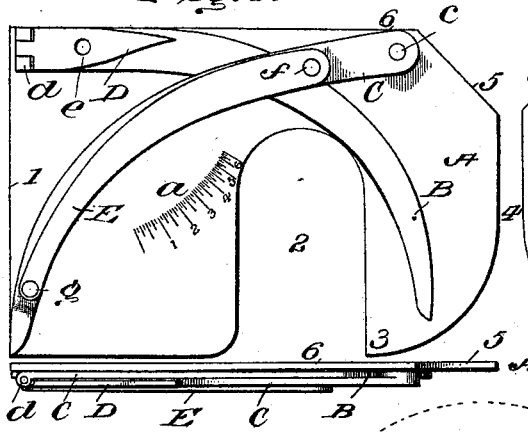
Figure 2:
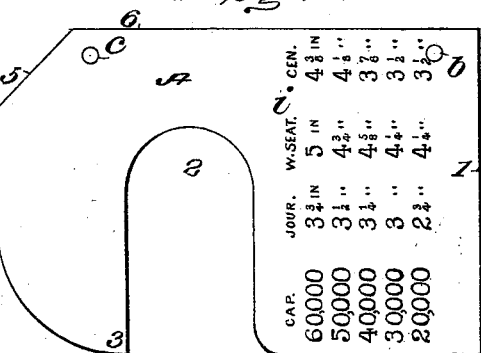
Figure 3:
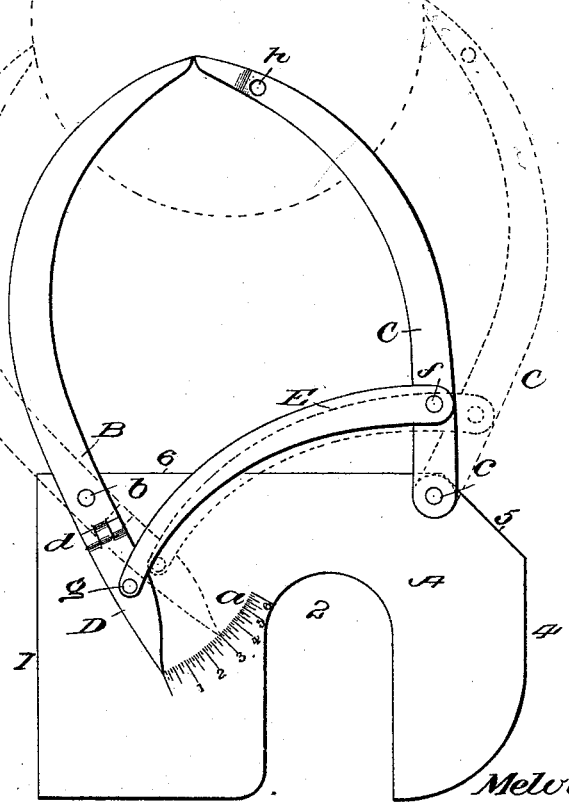

Figure 1 of the drawings is a face view, with an appended top view, showing the improved gage adjusted for use as a wheel-gage. Fig. 2 is a back view projected from Fig. 1, and Fig. 3 is a face view showing the improved gage adjusted for use as a journal-gage and illustrating its operation by full and dotted lines.

Like letters and numbers refer to like parts in all the figures.

An ordinary steel standard gage A may form the basis of this improved gage. The end 1 of such standard gage is used as the base of the gage in measuring by its width "shelled-out" or flat spots on the tread of a wheel, the notch 2 for measuring the flange to determine whether it is thinner than the standard, the point 3, with the surface 4 as the base of the gage, for determining whether the flange is sharper than the standard, the bevel 5 to avoid the curve uniting tread and flange in measuring by the extreme length of the gage the width of tread, and the edge 6 as the base of the gage in the operation last named, the object of which is to determine whether a chipped rim reduces the width of tread below the standard. I provide one side of such standard gage, herein termed its "face," with a graduated arc $a$, Figs. 1 and 3. By a pivotal rivet $b$, concentric with said arc and preferably adjacent to the angle uniting said surfaces 1 and 6, I attach to the gage A a caliper-leg B, and by a parallel rivet $c$, conveniently within the angle between said bevel 5 and said surface 6, I attach thereto a second caliper-leg C. To the pivot end of said leg B an index D is attached by a hinge $d$, said index being provided with a hole $e$, Fig. 1, and to said leg C an equalizing-link E is pivoted by a rivet $f$, Figs. 1 and 3, and provided at its other end with a stud-pin $g$, which is snugly fitted to said hole $e$ in the index D and also to a hole $h$, Fig. 3, in the leg C.

While the gage is being employed as a wheel-gage, as above described, or is out of use, the index D is folded back on the leg B and the link E overlies the leg C, with said pin $g$ sprung into said hole $h$ and the legs folded within the compass of the gage A and so as not to obstruct the notch 2, as in Figs. 1 and 2.

The gage is prepared for use as a journal-gage, as shown in Fig. 3, by turning the legs B and C into their working position, turning down the index D against the gage A, so as to point to the arc $a$, and freeing the pin $g$ from said hole $h$ and interlocking it instead with said hole $e$, Fig. 1, in the index. The calipers can now be conveniently inserted into almost any axle-box, so as to take the measurement of the journal, and the measurement is indicated with mechanical accuracy on the upturned face of the gage A by the index D and graduated arc $a$, as illustrated by dotted lines in Fig. 3. A thumb over the pin $g$ serves at once to keep it interlocked with the index D and to press the latter against the supporting-plate formed by the gage A to insure correctly reading the measurement indicated by the arc $a$.

The back of the gage A is conveniently provided with a table $i$, Fig. 2, showing the standard diameter of journal, width of wheel-seat, and diameter of "center" for cars of different capacities.

The table $i$ may be omitted to reduce the cost of the improved gage; the link E may be directly connected with the leg B instead of indirectly, and by means of a stud-pin and hole, as above described, or by other approved means; the shapes and proportions of the several parts may be varied, so long as the mode of operation above described is preserved, and other like modifications will suggest themselves to those skilled in the art.

Having thus described said improvement, I claim as my invention and desire to patent under this specification—

1. A gage for car-wheels and journals comprising a standard wheel-gage provided with a graduated arc, a pair of caliper-legs pivoted to said gage, one of them concentric with said arc, an index carried by this leg, an equalizing-link pivoted to one of said legs, and means for detachably connecting said link with the other leg.

2. The combination, substantially as hereinbefore specified, of a notched standard gage, a pair of caliper-legs pivoted thereto and adapted to be folded within its compass and so as not to obstruct the notch, an equalizing-link which connects the legs in their working positions and is adapted to overlay one of the folded legs, and means for fastening the respective ends of said link in its different positions.

3. The combination with a supporting-plate, provided on one side with a graduated arc, of a pair of folding caliper-legs pivoted to said plate, one of them concentric with said arc, an index hinged to this leg, an equalizing-link pivoted to the other leg, and a pin-and-hole connection between said link and said index, substantially as hereinbefore specified.

MELVIN B. EVY.

Witnesses:
MINER A. ATMUR,
WILLIAM MUMAUGH.